(12) United States Patent
Krasny et al.

(10) Patent No.: US 9,643,316 B2
(45) Date of Patent: May 9, 2017

(54) SEMI-AUTONOMOUS MULTI-USE ROBOT SYSTEM AND METHOD OF OPERATION

(75) Inventors: Darren P. Krasny, Gahanna, OH (US); Richard L. Shoaf, Westerville, OH (US); Jeffrey D. Keip, Columbus, OH (US); Scott A. Newhouse, Grove City, OH (US); Timothy J. Lastrapes, Powell, OH (US)

(73) Assignee: Battelle Memorial Institute, Columbus, OH (US)

( * ) Notice: Subject to any disclaimer, the term of this patent is extended or adjusted under 35 U.S.C. 154(b) by 354 days.

(21) Appl. No.: 13/503,122

(22) PCT Filed: Oct. 27, 2010

(86) PCT No.: PCT/US2010/054225
§ 371 (c)(1),
(2), (4) Date: Apr. 20, 2012

(87) PCT Pub. No.: WO2011/056633
PCT Pub. Date: May 12, 2011

(65) Prior Publication Data
US 2012/0215354 A1    Aug. 23, 2012

Related U.S. Application Data

(60) Provisional application No. 61/255,257, filed on Oct. 27, 2009.

(51) Int. Cl.
*G05B 19/04* (2006.01)
*G05B 19/18* (2006.01)
*B25J 9/16* (2006.01)

(52) U.S. Cl.
CPC ... *B25J 9/1666* (2013.01); *G05B 2219/40183* (2013.01); *G05B 2219/40418* (2013.01); *G05B 2219/40424* (2013.01)

(58) Field of Classification Search
CPC ... B23K 26/0807; B25J 9/1664; B25J 9/1666; G05B 2219/40613; G05B 2219/40424
USPC .................................................. 700/245–264
See application file for complete search history.

(56) References Cited

U.S. PATENT DOCUMENTS

| | | |
|---|---|---|
| 4,644,237 A | 2/1987 | Frushour et al. |
| 4,663,726 A | 5/1987 | Chand et al. |
| 4,922,430 A | 5/1990 | Wavish |
| 5,150,452 A | 9/1992 | Pollack et al. |

(Continued)

FOREIGN PATENT DOCUMENTS

| | | |
|---|---|---|
| FR | 2916152 A1 | 11/2008 |
| JP | 2009211571 A | 9/2009 |

(Continued)

OTHER PUBLICATIONS

International Search Report, Application No. PCT/US2010/054225 dated Feb. 18, 2011.

(Continued)

*Primary Examiner* — Khoi Tran
*Assistant Examiner* — Harry Oh
(74) *Attorney, Agent, or Firm* — MacMillan, Sobanski & Todd, LLC

(57) ABSTRACT

A semi-autonomous robot system (10) that includes scanning and scanned data manipulation that is utilized for controlling remote operation of a robot system within an operating environment.

21 Claims, 15 Drawing Sheets

(56) References Cited

U.S. PATENT DOCUMENTS

| | | | |
|---|---|---|---|
| 5,347,459 A * | 9/1994 | Greenspan | B25J 9/1666 345/424 |
| 5,416,321 A * | 5/1995 | Sebastian | B25J 5/005 250/288 |
| 5,545,960 A * | 8/1996 | Ishikawa | G05D 1/0255 318/568.12 |
| 5,548,694 A | 8/1996 | Frisken Gibson | |
| 5,673,377 A | 9/1997 | Berkaloff | |
| 5,966,132 A | 10/1999 | Kakizawa et al. | |
| 6,113,343 A * | 9/2000 | Goldenberg | B25J 5/005 239/587.2 |
| 6,651,240 B1 | 11/2003 | Yamamoto et al. | |
| 6,678,582 B2 | 1/2004 | Waled | |
| 6,873,944 B1 | 3/2005 | Buttolo et al. | |
| 7,102,315 B2 | 9/2006 | Nakata et al. | |
| 7,373,220 B2 | 5/2008 | Watanabe et al. | |
| 7,391,178 B2 | 6/2008 | Tanaka et al. | |
| 7,474,945 B2 * | 1/2009 | Matsunaga | G05D 1/0214 701/25 |
| 7,765,031 B2 | 7/2010 | Nagamatsu | |
| 7,774,099 B2 | 8/2010 | Kobayashi et al. | |
| 8,024,066 B2 * | 9/2011 | Reverte | E03F 7/10 318/568.16 |
| 8,311,731 B2 | 11/2012 | Sugiura et al. | |
| 8,315,738 B2 * | 11/2012 | Chang | B25J 9/1666 700/248 |
| 8,340,820 B2 | 12/2012 | Nair | |
| 8,355,818 B2 | 1/2013 | Nielsen et al. | |
| 8,996,174 B2 | 3/2015 | Brooks et al. | |
| 9,132,551 B2 | 9/2015 | Zhang et al. | |
| 9,144,904 B2 | 9/2015 | McGee et al. | |
| 9,296,106 B2 | 3/2016 | Schlaich et al. | |
| 9,345,544 B2 | 5/2016 | Hourtash et al. | |
| 2006/0218680 A1 | 9/2006 | Bailey, III | |
| 2006/0282234 A1 | 12/2006 | Pottage | |
| 2008/0009964 A1 * | 1/2008 | Bruemmer | G05D 1/0088 700/245 |
| 2008/0009966 A1 * | 1/2008 | Bruemmer | G06N 3/008 700/245 |
| 2008/0154538 A1 * | 6/2008 | Stathis | G01C 15/002 702/152 |
| 2009/0037033 A1 * | 2/2009 | Phillips | G05D 1/0088 701/2 |
| 2009/0234499 A1 * | 9/2009 | Nielsen | B25J 9/161 700/250 |
| 2009/0287363 A1 * | 11/2009 | Young | F41C 23/16 701/2 |
| 2009/0319081 A1 * | 12/2009 | Kock | G05B 19/4061 700/245 |
| 2009/0326711 A1 * | 12/2009 | Chang | B25J 9/1666 700/248 |
| 2010/0017046 A1 * | 1/2010 | Cheung | G01S 7/003 701/2 |
| 2010/0138796 A1 * | 6/2010 | Abramson | G01C 21/367 715/855 |
| 2010/0169774 A1 * | 7/2010 | Oda | H04N 5/23293 715/702 |
| 2010/0174410 A1 * | 7/2010 | Greer | A61B 19/2203 700/264 |
| 2010/0198402 A1 * | 8/2010 | Greer | A61B 19/201 700/247 |
| 2010/0234999 A1 * | 9/2010 | Nakajima | B25J 9/1628 700/261 |
| 2010/0312390 A1 | 12/2010 | Dupourque | |
| 2011/0043515 A1 * | 2/2011 | Stathis | G01C 15/002 345/419 |
| 2011/0054689 A1 * | 3/2011 | Nielsen | G05D 1/0088 700/258 |
| 2012/0215354 A1 | 8/2012 | Krasny et al. | |
| 2013/0178980 A1 | 7/2013 | Chemouny et al. | |
| 2015/0158178 A1 | 6/2015 | Burmeister et al. | |
| 2016/0059413 A1 | 3/2016 | Ogata | |
| 2016/0207199 A1 | 7/2016 | Kuffner, Jr. et al. | |

FOREIGN PATENT DOCUMENTS

| | | |
|---|---|---|
| WO | 9300261 A1 | 1/1993 |
| WO | 2008124713 A2 | 10/2008 |

OTHER PUBLICATIONS

"Battelle Multi-Use Robotic MURS", The Sherry Group Communications Specialists, Robot Magazine, pp. 32-35, Mar./Apr. 2009.

"Volume Graphics", Fundamentals of Voxelization, Visualization Lab, IEEE Computer, 1993, vol. 26, No. 7, pp. 51-64.

Yershova, Anna, et al., "Improving Motion Planning Algorithms by Efficient Nearest-Neighbor Searching", IEEE Transaction of Robotics, 2002.

* cited by examiner

Example of visualization of environment and robot.

Coverage trajectory with specified row spacing, sampling distance, and end-effector offset. Side view.

SEMI-AUTONOMOUS MULTI-USE ROBOT SYSTEM AND METHOD OF OPERATION

CROSS-REFERENCE TO RELATED APPLICATIONS

This application is the National Phase of International Application PCT/US2010/054225 filed Oct. 27, 2010, which designated the U.S. and claims priority to U.S. Provisional Application No. 61/255,257, filed Oct. 27, 2009. The disclosures of both applications are incorporated herein by reference.

STATEMENT REGARDING FEDERALLY SPONSORED RESEARCH OR DEVELOPMENT

This invention was made with U.S. Government support under Contract No. W91CRB-04-D-0016/DO 0003 awarded by the Department of the Army. The Government has certain rights in this invention.

BACKGROUND OF THE INVENTION

This invention relates in general to robotic systems and in particular to a semi-autonomous multi-use robot system and a method for cost effective operation of the system within an enclosed or confined space.

Aircraft integral fuel tanks are internally coated to prevent corrosion, and operational aircraft are flying with tank coatings that are as much as 40 years old. Coating degradation, including peeling, swelling, puckering, and blistering, has been observed in some tanks. To prevent fuel system clogging and damage from dislodged paint chips and corrosion products, tank coatings must be examined, assessed, and repaired or replaced as they age.

Existing tank inspection, cleaning, stripping, and recoating techniques are predominantly manual and are not easily automated using existing industrial robotic technologies due to the lack of accurate, structured knowledge of the environment, which is especially true of legacy systems. This is because the use of modern industrial robots to perform maintenance on legacy systems is typically not cost-effective because the geometric data required to define a structured environment is typically not available. For example, military aircraft produced in the 1960s were designed on a drawing board and therefore no electronic technical data of the structure exists. Even if the data did exist, current industrial robots rely on accurate and fixed tooling for location and a scripted software plan for the motion of the robot. Because no two locations are alike, a scripted software plan would be required for each separate work location. Furthermore, manual tank inspections are more expensive because they are labor intensive and less efficient due to the limited access for personnel to enter and maneuver within the tank. The confined space also creates human factors issues, including stringent safety requirements for personnel entering and working in the tanks. Accordingly, it would be desirable to provide an alternative to the use of maintenance personnel within aircraft fuel tanks to carry out these duties, such as industrial robot technology.

SUMMARY OF THE INVENTION

This invention relates to a semi-autonomous multi-use robot system and a method for operation of the system within an enclosed space.

The present invention is directed toward a semi-autonomous multi-use robotic system that provides a cost-effective means for employing industrial robotic technology in the maintenance and repair of legacy systems including aircraft integral fuel tanks. In order for industrial robotic technology to be cost-effective for maintenance of legacy systems, the present invention contemplates a new and novel approach to overcome the lack of digital data, the requirement for fixed tooling, and the need to generate scripted path planning algorithms. Accordingly, the present invention contemplates a robot system that acquires the geometrical data to define the required "structured environment" in order to perform operations without the need for fixed tooling, i.e., using "virtual tooling".

The invention contemplates using a laser scanning device to gather digital information that will be used to define the required structured environment. Also, the invention contemplates combining the data gathered from the laser scanning device or other 3-dimensional scanning device, such as, for example a 3-dimensional laser or infra-red scanning device, with the "user-defined" geometric data that defines the robotic system, to calculate the precise relative location between the robotic system and the work piece. This relative location is updated as the robotic system moves, which ensures that the robot "understands" its environment at all times for collision free operation without fixed tooling.

The invention contemplates the use of a Rapidly-exploring Random Tree (RRT) motion planning algorithm to control movement of the robot within an enclosed area. More specifically, the invention utilizes a combination of the precise relative location of the robotic system, the specific method of scanning the interior surfaces of an enclosed space, and the scanned data that defines the enclosed space, within the RRT algorithm to define collision-free paths within the enclosed space to efficiently move a robot and a robot mounted tool to a selected point within the space.

Although a robot system in accordance with the present invention is unlikely to completely eliminate human intervention, it should sharply reduce the amount of time that personnel must spend inside aircraft fuel tanks and improve tank maintenance productivity, efficiency, and effectiveness. The present invention contemplates a semi-autonomous Multi-Use Robotic System (MURS) that will enable aircraft maintenance personnel to remain outside a fuel tank, guiding the robotic system using an integrated positioning and vision system and remote controls.

The present invention contemplates a robot system that includes a robot with an arm having multiple degrees of freedom of movement, the robot being carried by a movable carriage. The system also includes a scanner mounted upon an end of the robot arm, the scanner being operational to record the environment surrounding said robot, and an operator station located remotely from the robot arm, the operator station being operable to control movement of said robot arm and carriage. The invention further includes a track upon which the carriage is mounted, the track guiding the movements of the carriage.

The invention also contemplates combining data gathering with a laser device and the use of a Rapidly-exploring Random Tree (RRT) motion planning algorithm to control movement of the robot within an enclosed area. More specifically, the invention utilizes a combination of the specific method of laser scanning the interior surfaces of an enclosed space and using the scanned data with the RRT algorithm to define surfaces within the enclosed space and paths for efficiently moving a robot and a robot mounted tool to a selected point within the space. Alternately, the collected data is voxelized to define surfaces within the robot operating environment and outer bounds of the robot. Voxelized data is then utilized to determine the paths for the carriage and the robot arm that avoid any collision between the arm and carriage with the operating environment surfaces. The alternate approach may be used for either an enclosed or a non-enclosed space.

The invention also contemplates the use of a color camera capable of acquiring color imagery of the workspace. This imagery, when registered to the 3D data obtained from the scanner, can be used to create a pseudo-photorealistic 3D model of the environment. This model can be used by the user for various purposes and archived to create a 3D representation of the workspace. In addition, this 3D color model can be processed using various machine vision algorithms to identify regions of interest for robotic processing.

The invention also contemplates real-time collision avoidance such that the remote operator may command the robot's end-effector in a teleoperated sense using a joystick or similar device to operate the robot in either an enclosed or non-enclosed space. Commanded robot positions are checked first in the simulator before being sent to the robot. Commands are provided in velocity mode and integrated to determine the desired robot position. Individual joint rates of the robot are calculated to provide the desired end-effector velocity in Cartesian space. A look-ahead feature projects the commanded velocity several time steps ahead into the future to provide a safety buffer since the robot requires a finite time to stop motion dependent on the current velocity. Any command that would potentially result in a collision between the robot and the workspace or between different elements of the robot itself is not sent to the robot controller. The user is then alerted to the potential collision.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
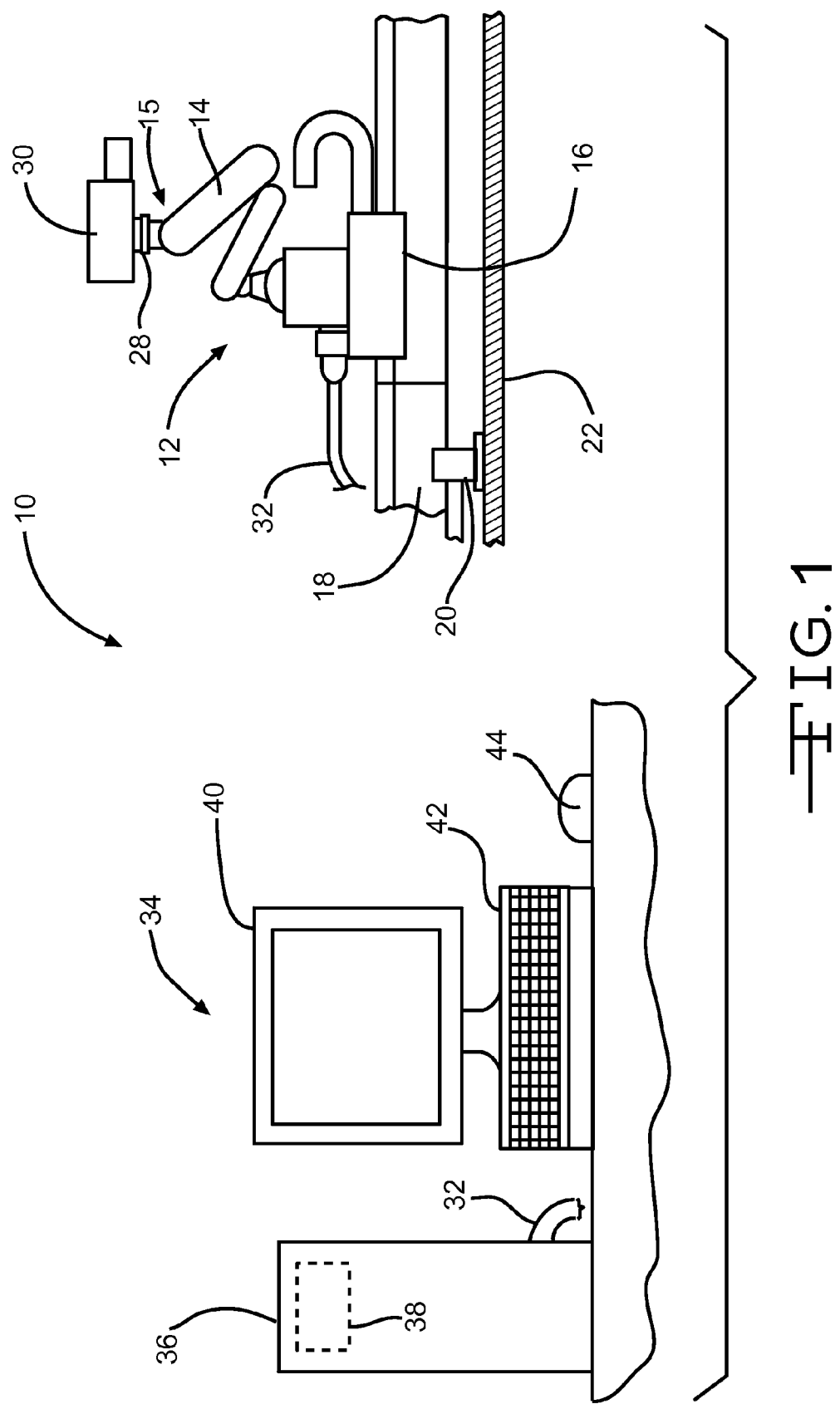
FIG. 1 is a schematic drawing of a Multi-Use Robot System (MURS) in accordance with the present invention that includes a robot having six degrees of freedom for movement.
Figure 2:
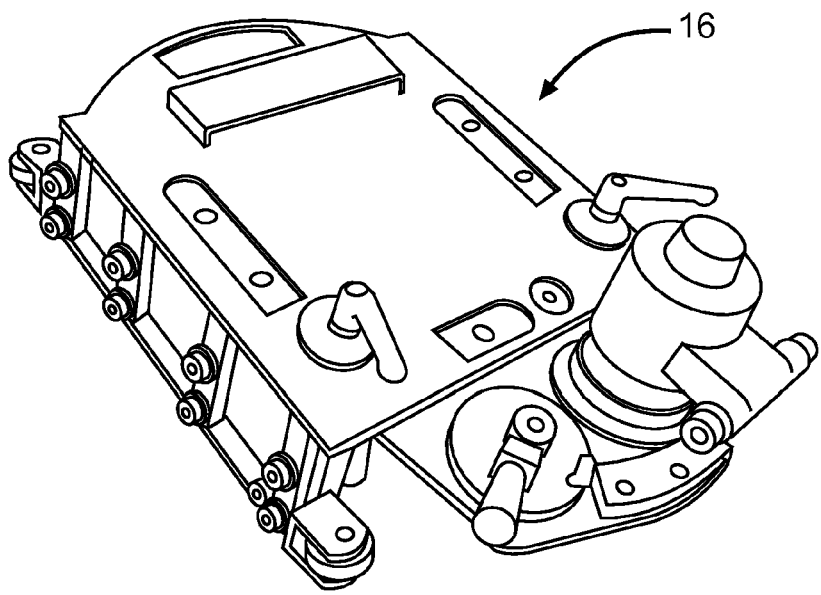
FIG. 2 illustrates a movable carriage the carries the robot included in the MURS shown in FIG. 1.

Referring now to the drawings there is illustrated in FIG. 1 a Multi-Use Robotic System (MURS) 10 in accordance with the present invention. The MURS 10 includes a compact industrial robot 12 having an arm 14 capable of providing six degrees of freedom comprising movement along three orthogonal axes (X, Y and Z) as well as rotation about three axes (pitch, roll and yaw) to a device mounted upon the operational end 15 of the arm. The robot 12 is mounted upon a movable carriage 16 that is carried upon a sectional track 18. The sectional track 18 includes two parallel rails for guiding the carriage 16. The movable carriage 16 is shown in FIG. 2 and traverses the track 18 to add a degree of coarse motion to the MURS 6-degree of freedom robot 12 by moving the robot into position for finely tuned robotic moves. The carriage 16 includes a servo motor (not shown) that drives a gear. The gear engages a rack (not shown) on the track 18 to move the carriage 16 along the track. The servo motor is reversible to allow bi-directional movement of the robot 12 along the track 18. Use of sectional track 18 allows tailoring the length of the MURS installation to fit a specific application by combining two to four, or more, sections of track.

Figure 3:
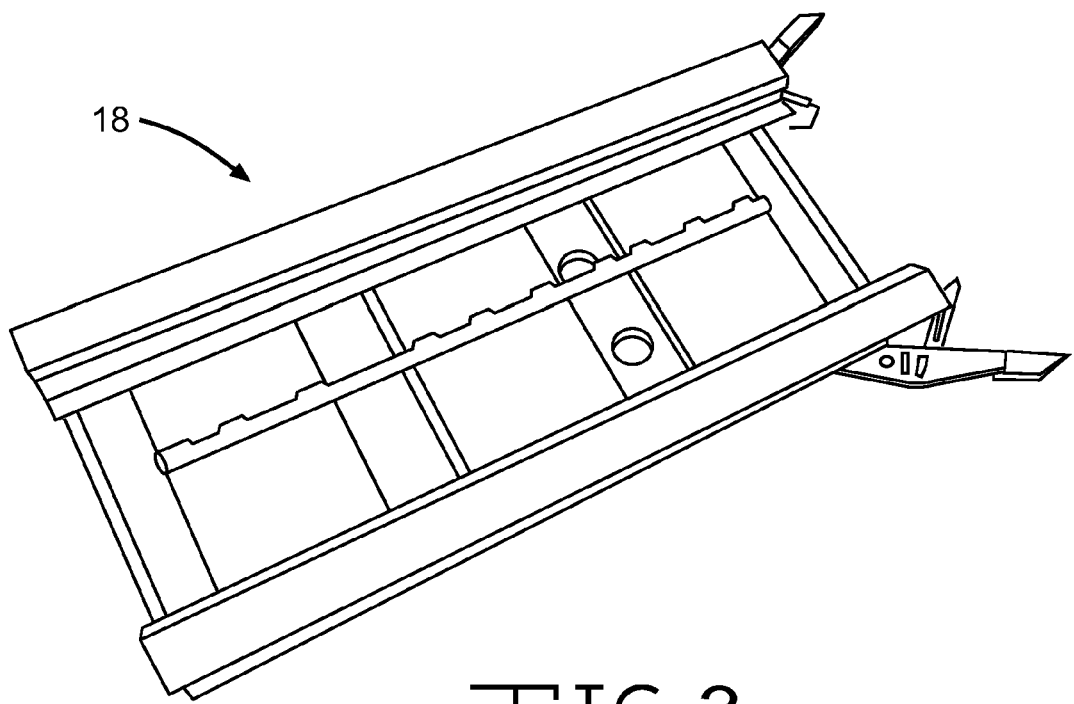
FIG. 3 illustrates a piece of sectional track that carries the carriage shown in FIG. 2.
Figure 4:
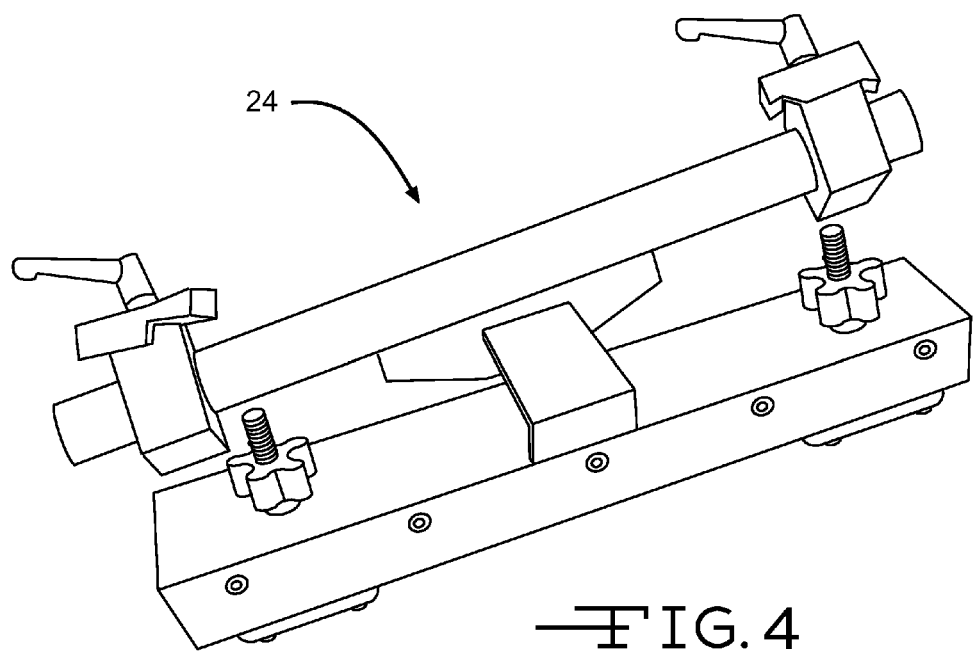
FIG. 4 illustrates a clamp with three degrees of freedom that is utilized to secure the sectional track shown in FIG. 3 within a working environment.
Figure 5:
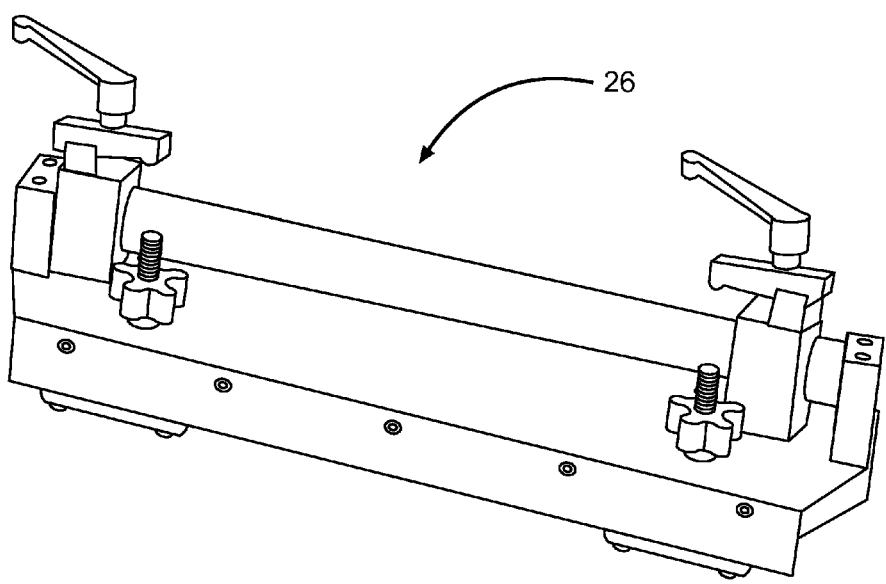
FIG. 5 illustrates a clamp with two degrees of freedom that is utilized to secure the sectional track shown in FIG. 3 within a working environment.
Figure 6:
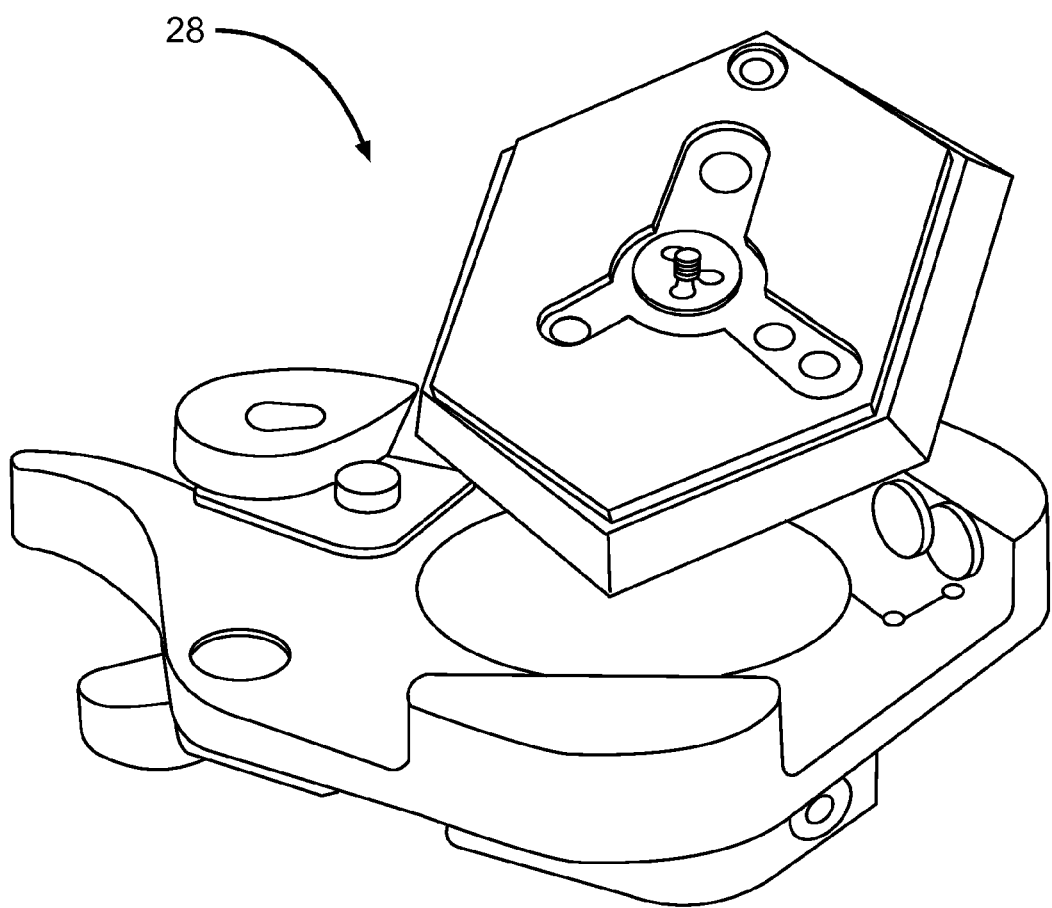
FIG. 6 illustrates a tool mount carried by the robot shown in FIG. 1.

A section of the track is illustrated in FIG. 3. A calibration plate (not shown) is incorporated into the end rail to section for set-up calibration of the MURS. The track 18 is held in place by a plurality of support clamps 20 (one shown) that are secured to frame members of an aircraft's internal wing structure. The invention contemplates two different support clamps. A first support clamp 24, which is shown in FIG. 4 pivots with three degrees of freedom to allow an installer to adjust the track rails and afford easy alignment with the second clamp. The second clamp 26, which is shown in FIG. 5, pivots with less freedom and stabilizes the rail assembly when tightened into position. These two clamps facilitate installation and set-up of the MURS within an enclosed or confined space. The clamps were designed so that each can attached to any section of the rail at any point along the length of the section. This design eliminates a requirement of a third, center rail support.

Figure 9:
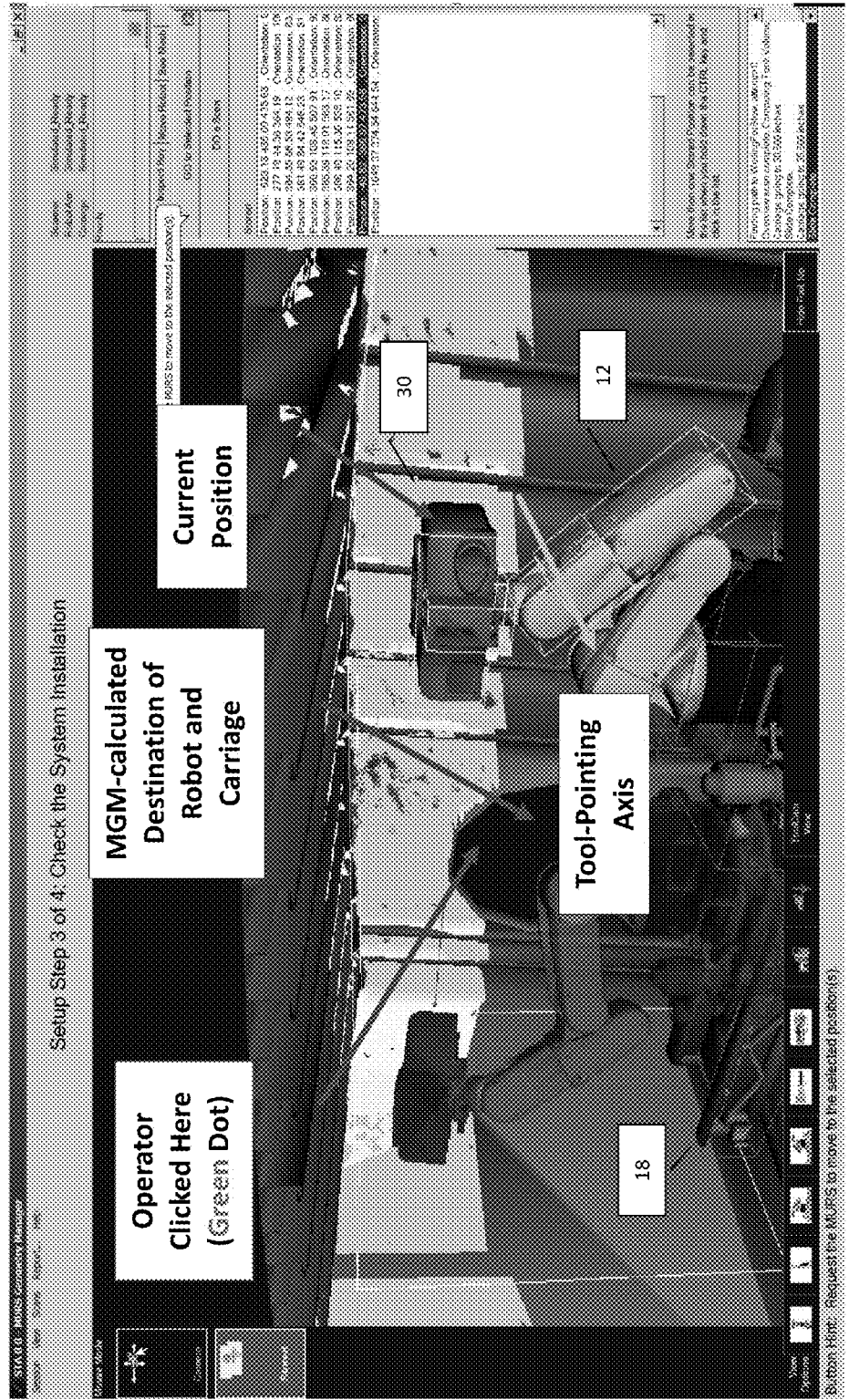
FIG. 9 illustrates a display screen as utilized by an operator operating the MURS shown in FIG. 1.

Returning to FIG. 1, a tool mounting bracket 28 is attached to the operational end 15 of the robot arm 14 and carries a tool which is shown as a three-dimensional (3D) scanner. The invention contemplates using a commercially available 3D scanner, such as, for example, Mesa Imaging's Swiss Ranger 4000 (SR4000, depicted in FIG. 17), which has been integrated with the system. This particular 3D scanner is smaller, lighter, and faster than some other commercially available 3D laser scanners, and has a frame rate of over 50 Hz. However, the SR4000 has much lower resolution and accuracy than other available scanners, but the lower resolution and accuracy are not critical for acquiring the surrounding environment for collision-free path planning. Accordingly, other 3D scanners may be utilized with the MURS 10 if more accuracy is required, including a 3D laser scanner from 3D Digital Corp. which has a depth resolution of 0.007 inches and as shown in FIG. 9.

FIG. 5 illustrates the mounting bracket 28 in greater detail. Multiple considerations drove the design of the mounting for the 3D scanner. First of all, rough handling can knock the internal optics in the 3D scanner out of alignment, so the scanner mounting bracket 28 had to enable the operator to install the scanner and be reasonably sure that it was properly positioned before letting go of it. Furthermore, the mounting bracket 28 also had to provide support the 3D scanner because the light gauge material of the scanner housing may flex and bend as the robot moved the scanner from vertical to horizontal positions and back. Finally, the 3D scanner mounting bracket 28 had to prevent improper installation since a "rotated" orientation could prove detrimental to MURS operation.

Additionally, the mounting bracket 28 was designed as a Manfrotto rapid connect camera mount, such as a COTS mounting system; however, it will be appreciated that the invention also may be practiced utilizing other mounting hardware. This mount, designed for quick mounting of a camera onto a tripod, employs three contact faces for fast, repeatable connection and tool-less operation. A clamping arm engages a passive portion of the mounting apparatus and snaps into position with a notable and definite click. The mounting bracket 28 includes a modified hexagonal design of the passive mount as a simplified tab and slot to "key" the installation, thus ensuring that the 3D scanner 30 can only be installed in the correct position. The tab also captures the scanner when the installer presses it into position. If the latching mechanism fails to snap into position, the scanner will sit at a noticeable "tilt" to indicate to the installer that it is not properly secured, yet the tab assures that the scanner does not fall if it is inadvertently released.

A mounting plate (not shown) attached to the bottom of the 3D scanner 30 provides additional rigidity to the scanner. The mounting plate also holds a COTS digital camera (not shown) to provide the digital picture for overlay of the scan files. Accurate positioning of the camera is necessary for proper registration of the overlay to the scanned image and the mounting plate provides the required alignment. The invention also contemplates including lights on the robot to illuminate the work place for the digital camera.

The present invention also contemplates that the 3D scanner may be either replaced by a job specific tool (not shown) or may carry a job specific tool. The tool mount is perpendicular to the robot's J6 axis of rotation, thus providing an additional degree of freedom for scanner positioning.

An umbilical cable 32 connects the robot 12 and carriage 16 to an operator control station, which is shown generally at 34 in FIG. 1. In the preferred embodiment, fiber optic cable is utilized instead of typical twisted pair cable because the twisted pair cable may pick up noise from the carriage drive motor that could drown out communications with the scanner. A cable trough (not shown) is included at the base of the robot 12 to manage the loose portion of cable 32. This trough provides a workable solution, acting to control the lower portion of the cable 32 to prevent it from becoming entangled in the carriage drive motor as the robot travels to the extremes of its motion. Mounting the trough at the proper working level requires a "riser" that is designed to provide a double duty as a handle for carrying the robot. Clips (not shown) are provided to hold the cable 32 onto the robot and are installed along the robot to reduce the chance of snagging the cable on an external structure.

The operator control station 34 includes a personal computer 36 that is responsive to a control algorithm stored in a computer hard drive 38 to control the MURS 10. Operator interface with the computer 36 is shown as being provided with a display screen 40, a keyboard 42 and a mouse 44. It will be appreciated that the operator interface may utilize different components than are shown. For example, a touch screen display may replace the display screen, keyboard and mouse. Additionally, a dedicated processor may be utilized in place of the personal computer 36. As shown in FIG. 1, the umbilical cable 32 is connected to the computer 26 to provide communication with the robot 12 and carriage 16. The invention contemplates that the track, carriage and robot would be installed within the aircraft fuel tank by means of an access hatch. The umbilical cable 32 would pass through the access hatch (not shown) to allow placement of the operator station 34 outside of the fuel tank. The invention also contemplates optional use of transmitters and receivers (not shown) in place of the umbilical cable to allow placement of the operator station at a location remote from the aircraft.

Key to the operation of the MURS is a MURS Geometry Manager (MGM) which comprises an algorithm that controls system movements, numerous user interface enhancements, integration of the 3D scanner and the digital camera, and motion planning and collision avoidance strategies. The digital camera provides color imagery used in a photographic overlay. Common 3D graphics texturing techniques integrate 2D color information from the digital camera with the 3D geometry obtained by the scanner to provide a "photo-textured" 3D model, which is displayed on the control station screen 40.

Figure 7:
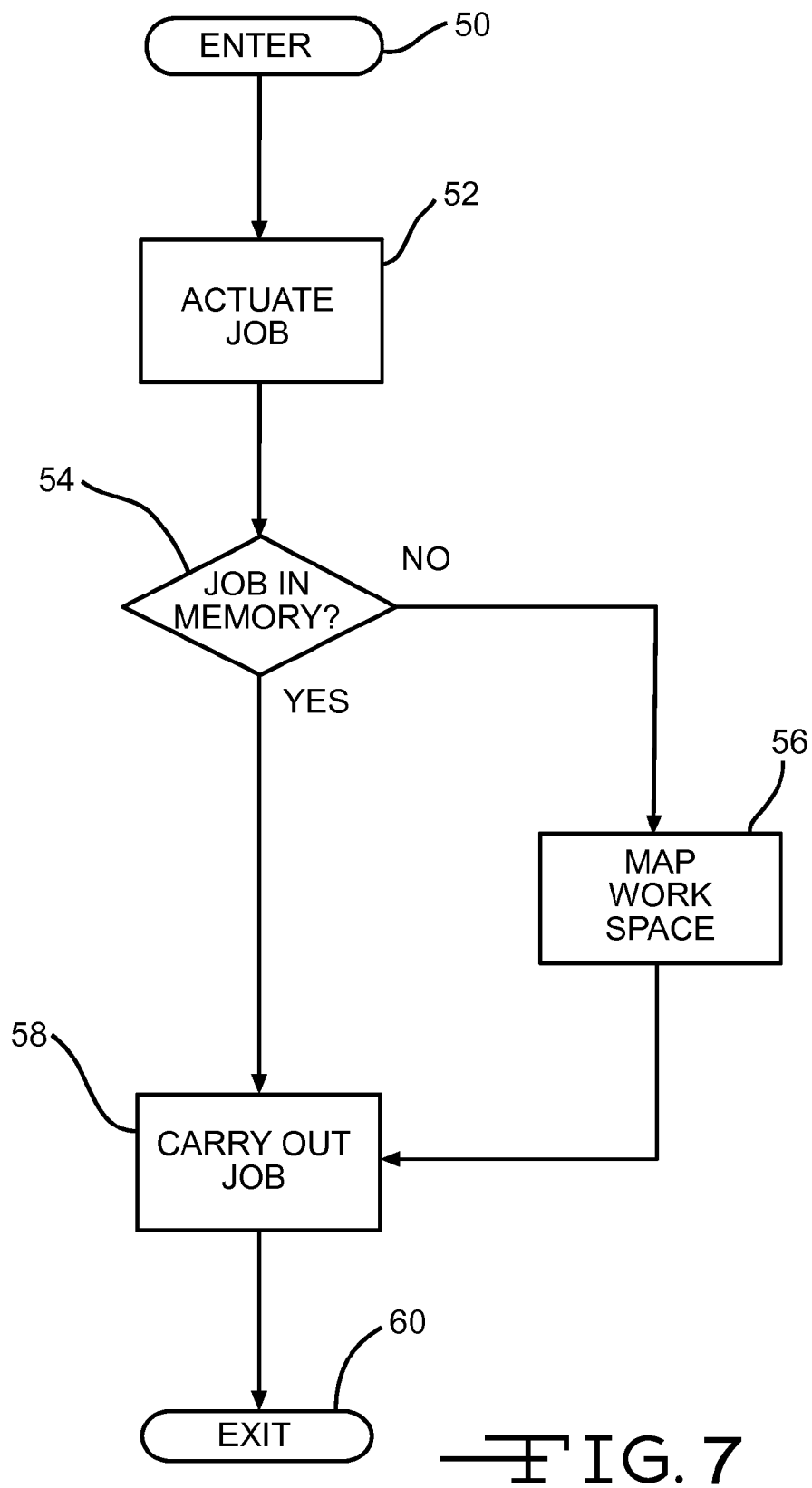
FIG. 7 is a flow chart for an algorithm for operating the MURS shown in FIG. 1.

A flow chart for the MURS MGM control algorithm is shown in FIG. 7. Before activating the control algorithm, the track 18, carriage 16 and robot 12 are installed within the aircraft fuel tank being serviced. As described above, one or more job specific tools may be attached to the end 15 of the robot arm 14. For example, an infrared camera may be utilized to "see through" a coating. A conventional handheld or robotic laser head may be mounted upon the end of the robot arm for coating and sealant removal from the fuel tank surfaces. Additionally, tools for drilling, painting, paint removal, inspection, polishing, grinding, grasping and/or marking may be attached to the end of the robot arm.

The algorithm is entered via block 50 and proceeds to functional block 52 where a specific job is activated by the operator requesting stored data for a specific job. The algorithm then advances to decision block 54 where it is determined whether or not data for the job is available. If the data is not available, the algorithm transfers to functional block 56 where data for the specific job is developed and saved, as will be described below. The algorithm then advances to functional block 58 to carry out the specific job. Returning to decision block 54, if the data for the specific job is available, the algorithm transfers directly to functional block 58 to carry out the specific job.

Figure 8:
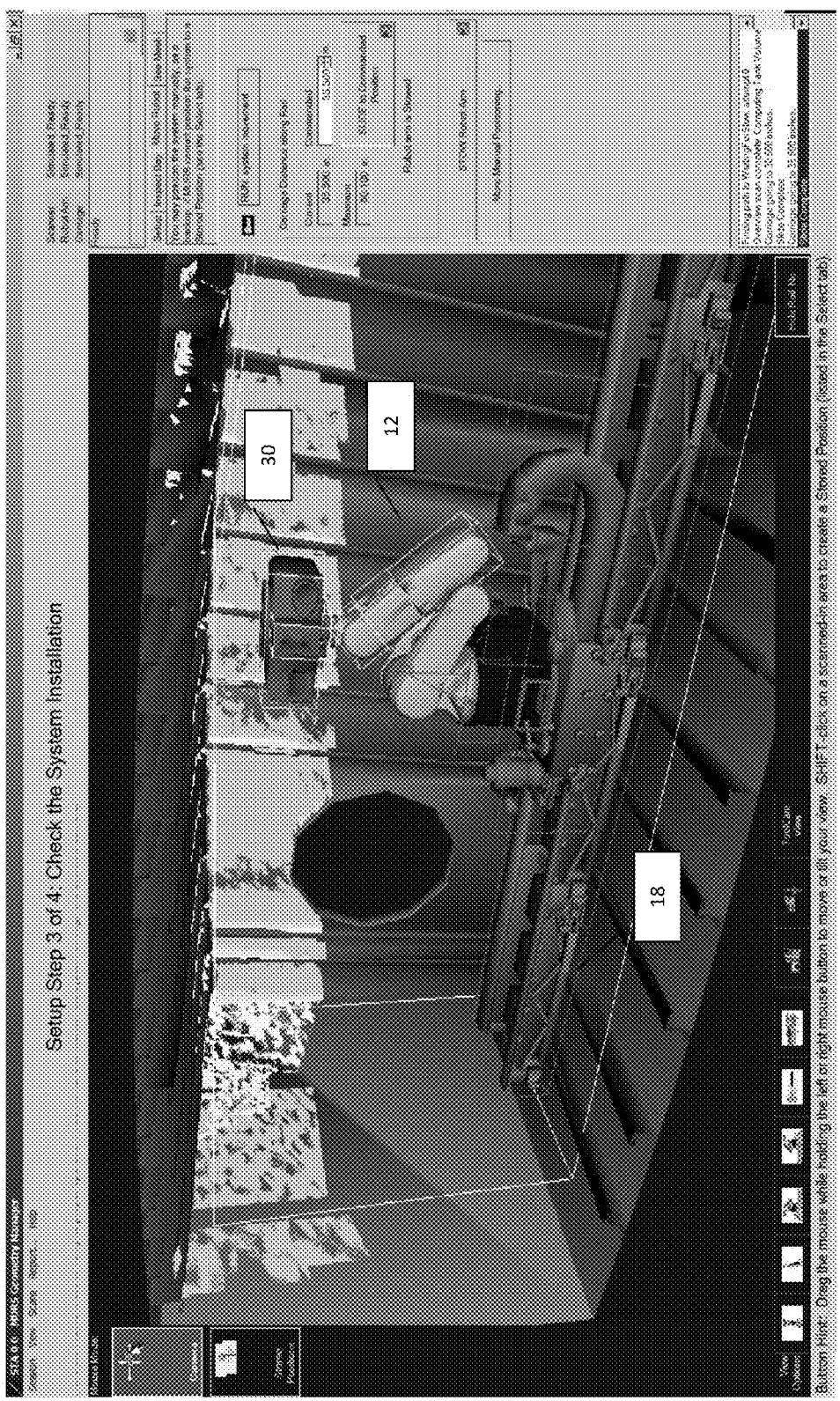
FIG. 8 illustrates a display screen for operation of the MURS shown in FIG. 1.

In functional block 58, a "mixed-reality" 3D display of the MGM, as illustrated in FIG. 8 is displayed upon the screen 40 and provides the primary way for the operator to self-orient to the position and pose of the robot 12 within the wing tank. The system 10 includes an operator-controlled "Virtual camera" that can be set at orthogonal view (front, back, left side, right side, top, and bottom) presets, or dragged around to arbitrary viewpoints. The virtual camera positions may be activated by means of the preset buttons shown at the bottom of the screen in FIG. 8. Various operator prompts are also shown in FIG. 8 along the right side of the display. Wing tank walls are acquired by the 3D scanner and rendered in perspective on the display. Similar to a cut-away illustration, wing tank walls which are between MURS and the virtual camera position are not rendered, so that the virtual camera need not be confined to views within the volume of the wing tank.

The 3D display shown in FIG. 8 is fundamental to tool positioning where an operator clicks in this view on the surface that the robotic tool will point at, as illustrated in FIG. 9. This implies that the view contains the surface of interest; the operator must therefore be able to select a view containing the desired tool destination. For a stand-off tool such as the 3D scanner, the destination position may lie along the tool-pointing axis within a range of distances from the work surface. MURS can support other tools which require a precise offset. Once the job is completed, the algorithm exits through block 60.

Figure 10:
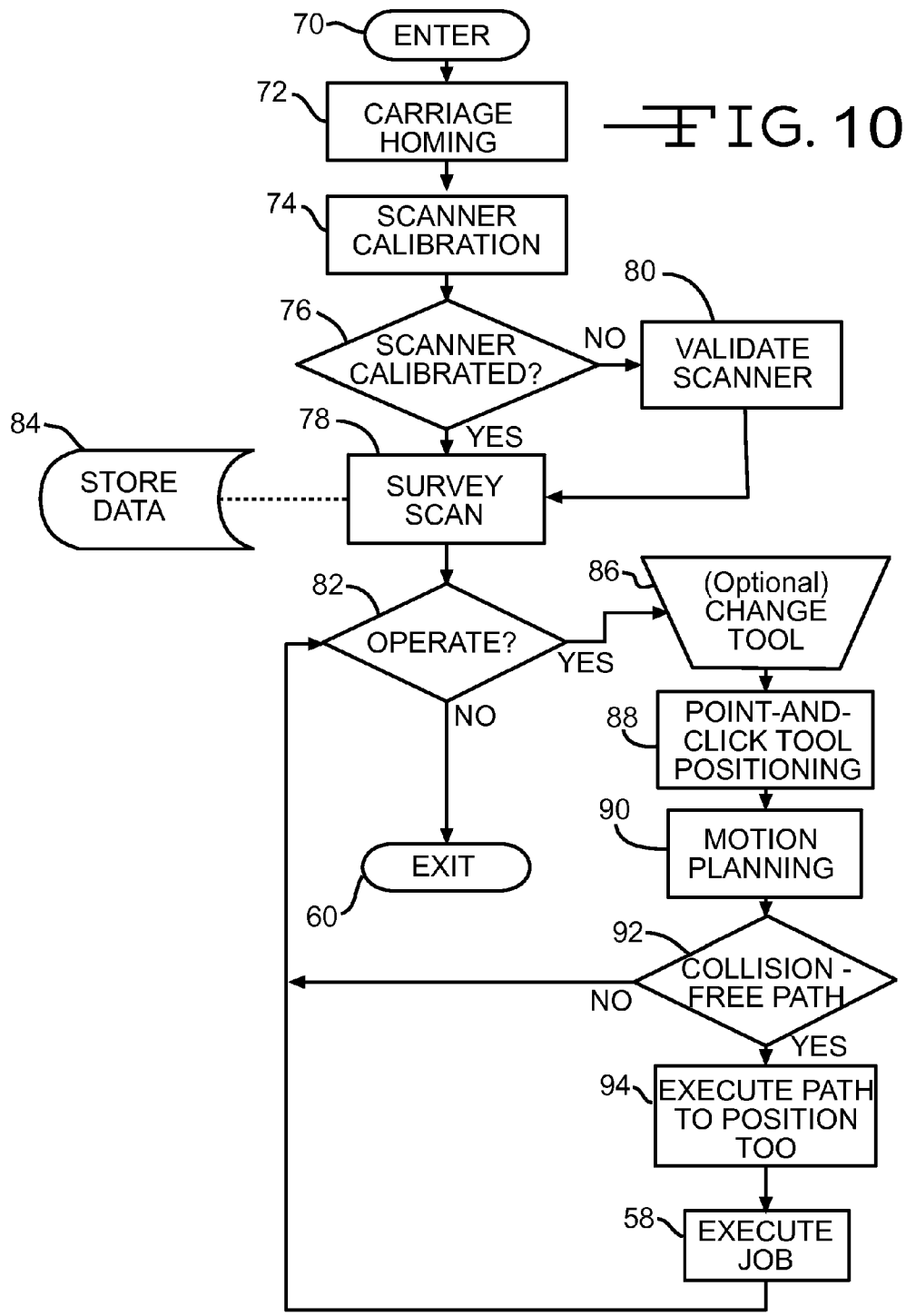
FIG. 10 is a flow chart for an algorithm for developing job data that is used in the algorithm shown in FIG. 7.

Returning to functional block 56, an algorithm for developing data for a specific job is illustrated in FIG. 10. The algorithm of FIG. 10 may also be utilized in a standalone manner to initially develop data for a new job. The algorithm is entered through block 70 and proceeds to functional block 72 where carriage homing is carried out. Since two, three, four, or more, rail sections of any length may be used in a MURS installation, the software needs to discover its permitted travel length along the rail. Accordingly, in functional block 72, the operator commands MURS carriage homing after installation, and the carriage moves end-to-end on the rail, recording a travel length that is stored in the software. This operation has been optimized with the system automatically determining the number of rails in use and can then reliably translate the system along the rail with high precision and repeatability.

While the truth of the rail-referenced 3D points depends on the integrity of the measurements of the rail position and robot arm angles, collision avoidance depends on the accuracy of these 3D points. Once homing is complete, the MURS software advances to functional block 74 and prompts the operator to perform a Scanner Calibration operation to validate the installation and configuration of the scanner. During this check, the robot is commanded to point the scanner at a known point on the rail. The algorithm then advances to decision block 76 where the system compares the result obtained from the scanner to the actual location of the known point. If the known point appears at the correct 3D location in each dissimilar scanner orientation, the system is functioning properly and the algorithm transfers to directly to functional block 78. If this test fails, the system must be validated before use and the algorithm advances to functional block 80.

In functional block 80, the scanner is validated. During validation, a least squares regression algorithm uses the system check data to determine the precise true position and orientation of the reference point of the 3D scanner with respect to the robot arm. This validation process will normally be performed once in a controlled environment outside the wing tank and then repeated if the scanner validation test fails. Once validation is completed, the algorithm advances to functional block 78.

In functional block 78, the operator will typically initiate a Survey Scan. This triggers a sequence of scans of the surrounding tank elements that builds up the surrounding geometric volume in the software. The Survey Scan commands a sequence of robotic moves resulting in varied 3D scanner positions, allowing the system to "have a look around" its bay in order to acquire the surrounding environment geometry. During the Survey Scan, the software operates the robot within a restricted volume to minimize risk of collision against tank surfaces not yet acquired. Thus, the laser scanner provides the system with direct knowledge of its surroundings. To compensate for its limited field of view, the scanner takes multiple scans and integrates them to detail the tank volume. Apart from electrical and signal aspects, laser scanner integration consists of taking the scanner-relative 3D points and translating them into MURS coordinates by applying the known robot end-effector position and orientation, as defined by robotic system angles and rail positions. In addition to being registered by the software, the acquired array of 3D points is also formed into a mesh. The operator monitors this automated process through the in-tank overview cameras and the virtual display. The virtual display, included as part of the MURS MGM, renders the current position of the robot arm and the current rail position. In addition, the virtual display renders the wing tank meshes acquired during the Survey Scan.

The invention contemplates that all meshes and photographs developed by the MURS during the Survey Scan are stored on the hard drive of the control station personal computer (PC) as shown by the dashed line extending from functional block 78 to block 84. This historical information can be recalled and displayed on the PC at a later date. Historical meshes and photographs can also be referenced within the optional robotic simulation mode, affording system training even when the robotic elements are not installed.

Once the Survey Scan is complete, the algorithm proceeds to decision block 82, where the operator may choose to operate the MURS to complete a task or exit the application. If the operator chooses to not operate the MURS, the algorithm exits through block 60. However, if the operator chooses to operate the MURS, the algorithm transfers to functional block 86, where the operator may manually change the end-effector for the desired task, if necessary. If the operator changes the end-effector, the operator must also choose the new end-effector from a list of pre-populated choices within the MGM software to ensure that the Motion Planning (MP) module computes collision-free paths with the correct end-effector geometry. The algorithm then proceeds to functional block 88. During this step, the operator selects a discrete location on the acquired meshes in the MGM software to position the end-effector for the given task. This is done by pointing and clicking the mouse on the desired location of the rendered mesh. This is referred to as "point-and-click robotic positioning," which is one of the benefits afforded by the present invention. The algorithm then advances to functional block 90.

In functional block 90, the MGM software computes a series of motions required to move the end-effector to a desired standoff distance from the surface of the tank. The target direction of the end-effector will be normal to the surface of the tank with the end-effector rolled to one of several acceptable angles that is configurable by the user. The algorithm then advances to decision block 92.

In decision block 92, the algorithm determines if the series of motions can be executed based on whether a collision-free solution was found. If no collision-free solution was found, the algorithm transfers to decision block 82, where the operator can choose a different point or exit the application. If, in decision block 92, it is determined that a collision-free solution was found, the algorithm transfers to functional block 94, where the actual robot arm and carriage execute the series of points found from the MP module. This positions the tool at the desired location and offset from the work surface. At this point, the actual end-effector operation will be enacted to complete the task in functional block 58. This may consist of inspection, polishing, paint stripping, recoating, or other actions. The algorithm then returns to decision block 82, in which the operator may continue or exit the application.

Coordinating the motions of mechanical components, the MURS software must not only command and sequence the movements of the MURS, but must also ensure that the movements do not cause collisions between the robot and the wing tank. The collision avoidance approach utilized with MURS is essentially a form of Look-Ahead Verification. The MURS software calculates a series of target waypoints for the end-effector's travel and then simulates the joint rotations required to traverse the path. The simulation is sampled at regular intervals within the path to ensure that no collision between any two parts of the robot and between any part of the robot and any part of the wing tank is possible during the motion. If the desired path would not cause any collisions, it is sent to the robot and the carriage controllers to be executed. If the simulation recognizes a chance of collision, the path is rejected and additional path refinement heuristics are used to determine a new path. This approach contrasts with prior art direct collision avoidance, in which a number of sensors would be mounted on the robot to indicate "close to collision" or "touching." Thus, the approach used in the present invention eliminates the sensor integration and maintenance complexities of prior art direct collision avoidance approaches.

Perhaps the most significant feature of the software is the inclusion of an advanced MP algorithm module that finds collision-free robot trajectories into confined areas where prior art strategies could not. Based on Kuffner and Lavalle's Rapidly-Exploring Random Tree (RRT) algorithm, the MP module is activated in functional block 90 and uses random-search with a tree-structured approach to efficiently find paths between a start and goal location in joint space. At each step, the corresponding robot configuration is checked for collision using a bounding box approach. Robot elements are contained in virtual boxes that are checked against each other and against the surrounding tank geometry for intersection. If any robot bounding box indicates a collision, with either another robot bounding box or the surrounding tank geometry, then the collision check fails and the motion path is rejected. Pre-collision avoidance ensures that a chosen tool path will not drive the robot into the structure, either at the end of the movement or during the repositioning. A greedy heuristic is then added to encourage optimal straight-line paths through joint space whenever possible. As a variation of the algorithm, the robot joint space is partitioned into the robot arm joint space and the rail translational space such that motion can occur in only one subspace at a time. This precludes having to coordinate arm and rail motion simultaneously if not required for the given task. Tests of the MP algorithm have demonstrated that complex, non-straight-line trajectories into highly confined spaces are now possible.

To facilitate the search for collision-free paths, a refined and enhanced Inverse Kinematics (IK) algorithm determines candidate goal positions for the robot. The IK algorithm module is utilized so that a number of different IK configurations are generated for a given tank inspection point. These configurations include alternative scanner orientations and offset distances from the virtual tank wall in order to increase the number of possible robot arm/rail position configurations and maximize the probability of finding a collision-free path to at least one. This set of goal positions is ordered in terms of "distance" in joint space from the current configuration, i.e., in terms of how similar each configuration is to the current one. The ordered set of possible IK solutions is then passed to the MP module, which attempts to find a path to at least one. During the search, intermediate preset positions are considered in order to facilitate the search.

In general, the MP module is capable of finding solutions to extremely challenging poses, although search time is obviously an issue. To encourage efficiency, the maximum number of search steps for each path is limited while the number of different possible routes is increased. On average, this allows the MP module to quickly find solutions to most locations inside the tank, with simple moves taking a few seconds and relatively complex moves taking less than a minute.

In order to find safe paths, the MP module must evaluate potential robot configurations against its current estimate of the tank working volume. Before the Survey Scan is completed, this volume is initially computed based on certain minimum clearances from the installed rail sections to provide the robot with just enough space to translate along the rail in a tucked position and rotate the scanning head without colliding with the tank. The installer must guarantee that this "default" volume is safe for operation by ensuring that the robot can translate along the rail in a tucked position without colliding with the tank. However, this volume is generally too small to permit arbitrary positioning of the system for inspecting different locations throughout the bay. Consequently, after the initial overview scan, the scanned data from the tank is used to compute a larger, better fitting estimate of the tank volume. Since fitting a three dimensional volume to the scanned data is a highly-nonlinear, nondeterministic polynomial-time hard (NP-hard) problem, evolutionary search was selected as the optimization method. Evolutionary search is a stochastic optimization approach based on artificial evolution where candidate solutions from a population are evaluated against a fitness function. Depending on the variant of the evolutionary algorithm, the best solutions "survive" and are used to generate new solutions during subsequent trials, or generations. Evolutionary search has been well-accepted in a variety of fields because of its ability to efficiently generate acceptable solutions in large-dimensional, non-linear, and unknown search spaces.

In this instance, an evolutionary search is used to find the largest tank volume that fits snugly inside the scanned vertices without any scanned vertex actually piercing the volume. The fitness function is constructed such that there is a heavy penalty for intrusion of scanned vertices into the working volume. This encourages the algorithm to quickly find solutions that are at least acceptable, with no intruding vertices. After a number of generations, the fit is improved as the fitness function rewards larger volumes. Typically, a suitable volume can be computed in twenty generations using 100 individuals in the population, which requires two to three minutes of computation time on the MURS PC.

The MP module is integrated with the action-related moves and scripts in the MGM algorithm in order to prevent dangerous, unchecked robot moves. To provide ultimate flexibility in unforeseen circumstances, a limited number of "unsafe", i.e., not collision checked, moves are still permitted—but are intended for advanced, knowledgeable operators only. These moves are clearly marked as not collision-checked and thoroughly documented in the MURS manual.

It will be appreciated that the algorithms shown in FIGS. 8 and 10 are intended to be exemplary and that the invention also may be practiced with algorithms that differ from the ones shown in the figures.

Because the robot umbilical is not rigid, it does not remain consistently within a reasonably-sized bounding box, and it is thus not amenable to Pre-Collision Avoidance calculations. Responsibility for umbilical clearance remains on the system operator, who sees the umbilical through the operator station display of an in-tank overview video camera.

To be acceptable, a system must be usable, so MURS is intended to be as simple to use as possible. However, simplicity needs to be balanced by flexibility, utility, and interactivity if the system is to meet requirements. For example, although a single operator command for "setup" might be desirable, a three setup command that reflects the three different ways the robot moves during the three setup steps is utilized. Similarly, although the operator might prefer to click a position and have the robot respond immediately, the current design allows the user to confirm the software's choice of robotic position before starting the move.

The MURS software characterizes the direction of rail travel as the X-axis, with the X-Y plane horizontal and the Z-axis pointing up. The MURS software considers a wing tank to be "installed" around itself, and wing tank surfaces thus are referenced to the XYZ coordinate system defined by the rail. As a result, translating MURS installation-specific coordinates to aircraft-referenced coordinates would be a separate effort that would likely require operator input or selection from a database of places where the MURS could be installed on the aircraft.

This aside, however, MURS graphical point-and-click tool positioning markedly simplifies operation of the robotic system. In MURS, the operator need not be concerned with choosing robotic arm angles or determining the precise XYZ coordinates of the end-effector. Instead, the operator chooses the desired location and allows the system to automatically determine how to point a tool at the desired location and how to find a collision-free path from its current pose to the desired pose.

Figure 11:
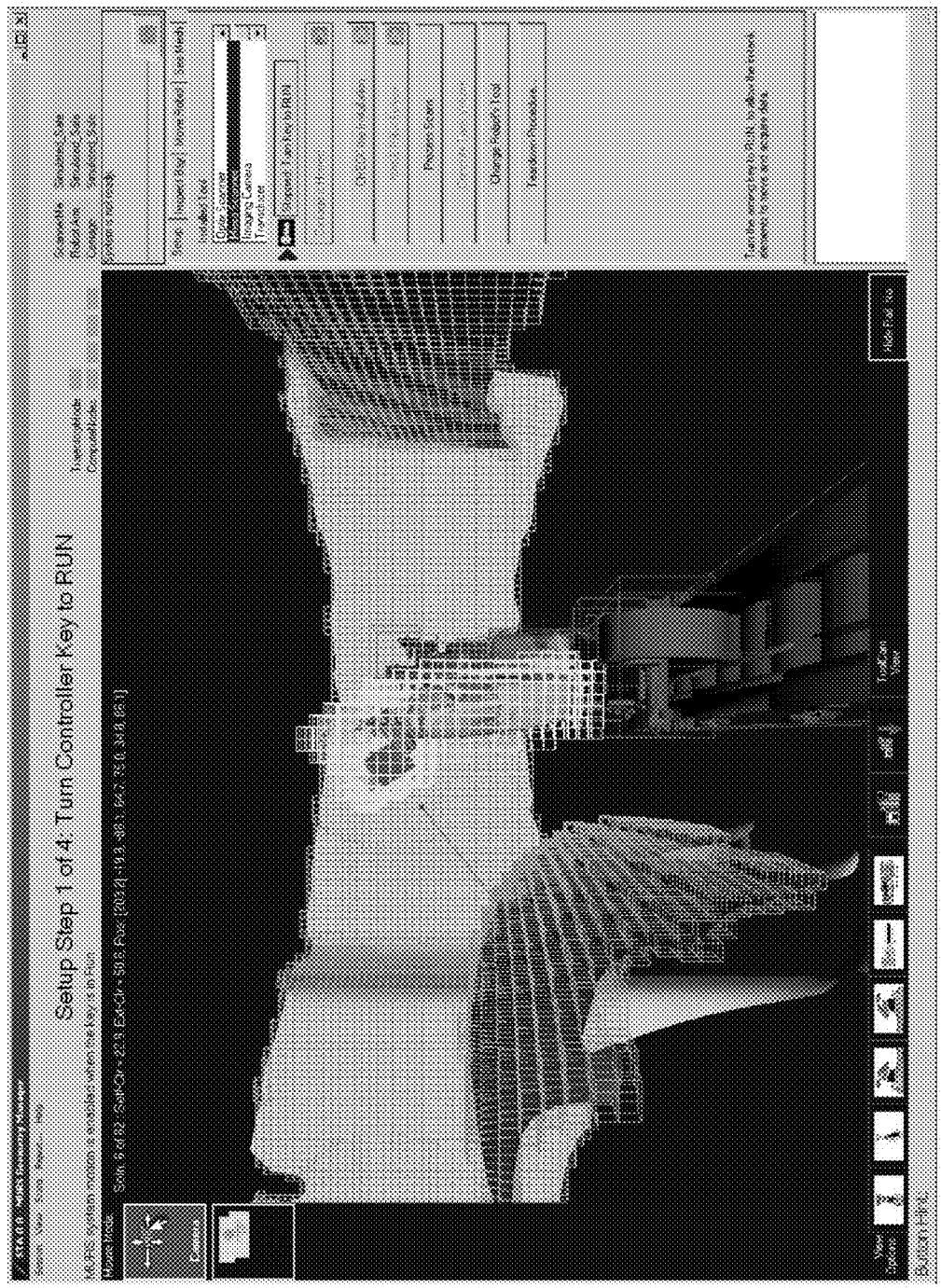
FIG. 11 illustrates an example of voxelized data scanned by the robot.

The present invention also contemplates an alternate method for collision-checking the surrounding environment. For the method described above, the environment is scanned and a parameterized volume fitted to the scanned data. This volume was then used to perform collision checking for path planning. Although this approach was efficient, it may be limited to applications in which a similar volume could be used to describe the environment, namely, confined space applications. With the alternate method, scanned data is voxelized by boxing the data into 3D volumetric pixels, called voxels. This is the equivalent of 3D rasterization and produces a 3D occupancy grid of the scanned data. The robot bounding boxes are then voxelized as well, and all voxels occupied by the robot are checked to ensure that they don't overlap voxels occupied by the scanned data, as illustrated in FIG. 11. Thus, the alternate method provides a much more general approach, which allows the robot system to be operated in almost any environment, including both confined spaces and non-confined spaces. Additionally, the alternate method utilizes a Graphics Processor Unit (GPU), which supports vector operations and greatly reduces computation times, for collision avoidance processing.

Although the baseline path planning algorithm remains the same, the alternate method contemplates executing the algorithm in parallel using a High-Performance Computing (HPC) cluster. Multiple computing nodes are connected via Ethernet and each computing node includes multi-core processors with multiple GPUs. The path planner generates many potential paths to different candidate goal configurations and distributes a set of these paths to each computing node. Each computing node spawns multiple threads to find potential paths using available computing cores and GPUs. Each computing node then returns its results to a head node. As soon as a solution is found, the head node notifies all computing nodes to stop processing.

One of the major additions to the original MURS MGM software is the ability to generate collision-free continuous trajectories for contour following. Under the original MURS software, only paths to a discrete point could be found. Multiple points could be selected on the surface, although the motion planner would find individual paths to each point, which would not, in general, produce the expected straight-line motion of the end-effector in Cartesian space. In order to produce continuous trajectories for contour following, it is necessary to find collision-free candidate "seed" solutions. Then, using standard pseudo-inverse Jacobian control, compute the required joint angles and rates to achieve the desired path of the end-effector while maintaining the proper orientation and path speed, i.e., commonly known as resolved motion rate control. As before, each step in the trajectory must be collision-checked to ensure that no part of the robot contacts any other part of the robot, i.e., experiences a self-collision, and that no part of the robot contacts the surroundings, i.e., experiences an external collision. Using a large number of seed solutions increases the probability of finding acceptable solutions that meet the following criteria:
  are collision-free,
  follow the desired path within a certain tolerance,
  maintain the desired orientation within a certain angle,
  maintain the desired path speed within a certain tolerance, and
  do not violate any joint limits or joint rate limits.

Figure 12:
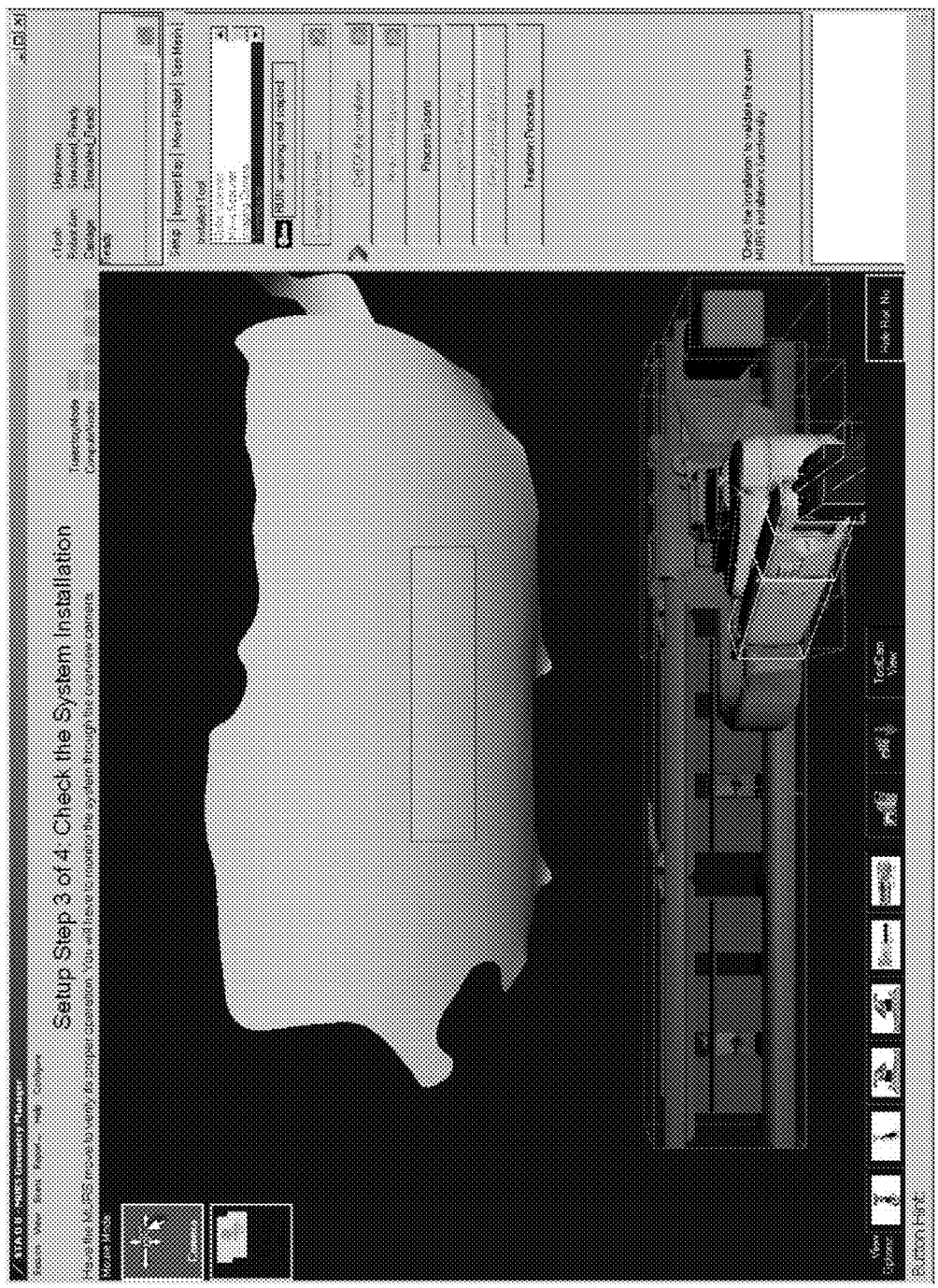
FIG. 12 illustrates the first step of the process for creating a coverage trajectory over the work surface by clicking and dragging a mouse to create a rectangular patch on the surface.
Figure 13:
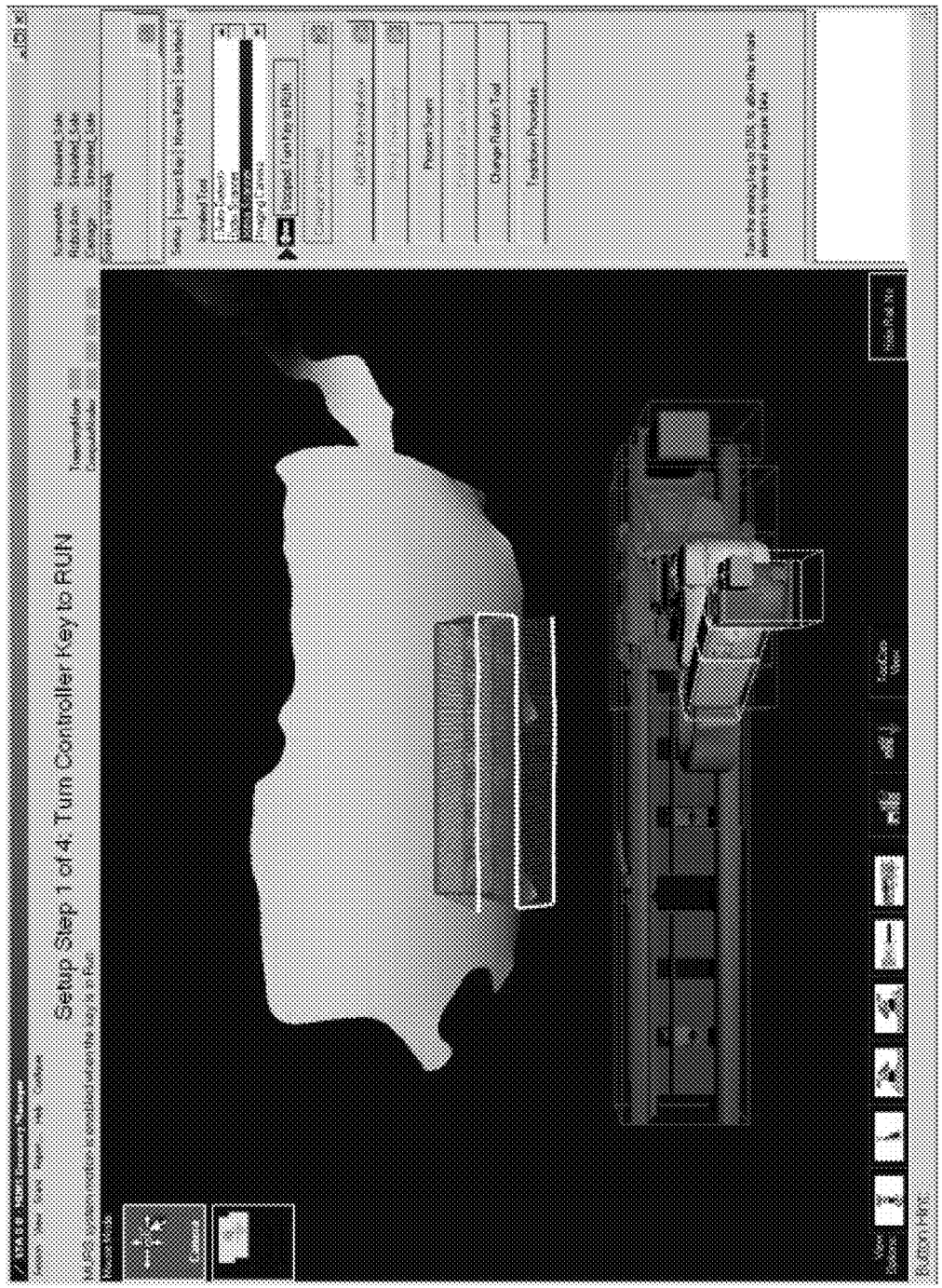
FIG. 13 is a plan view of a coverage trajectory for the selected rectangular patch from FIG. 12 that includes the specified row spacing, sampling distance and end-effector offset.
Figure 14:
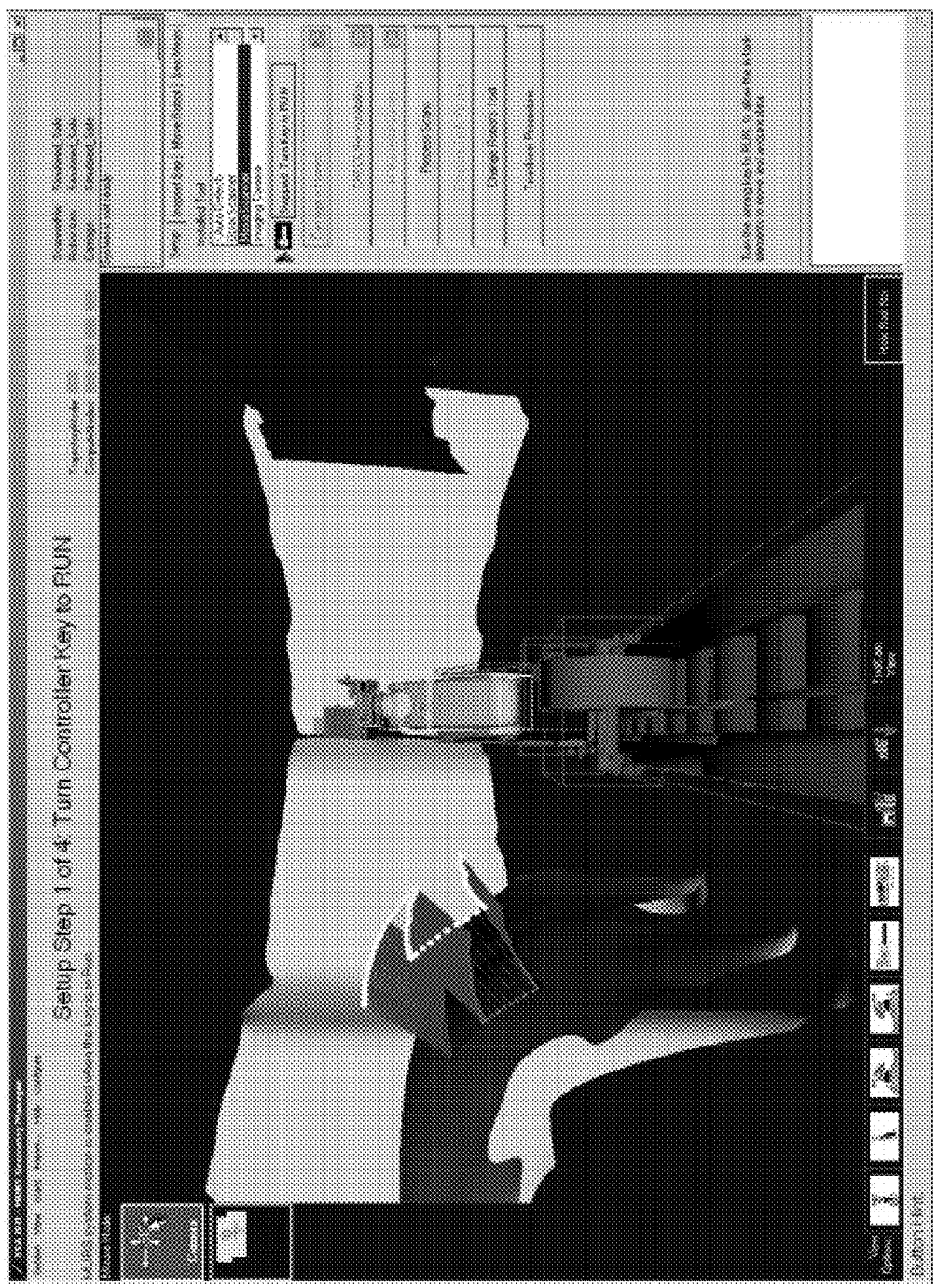
FIG. 14 is a side view of the coverage trajectory shown in FIG. 13.
Figure 15:
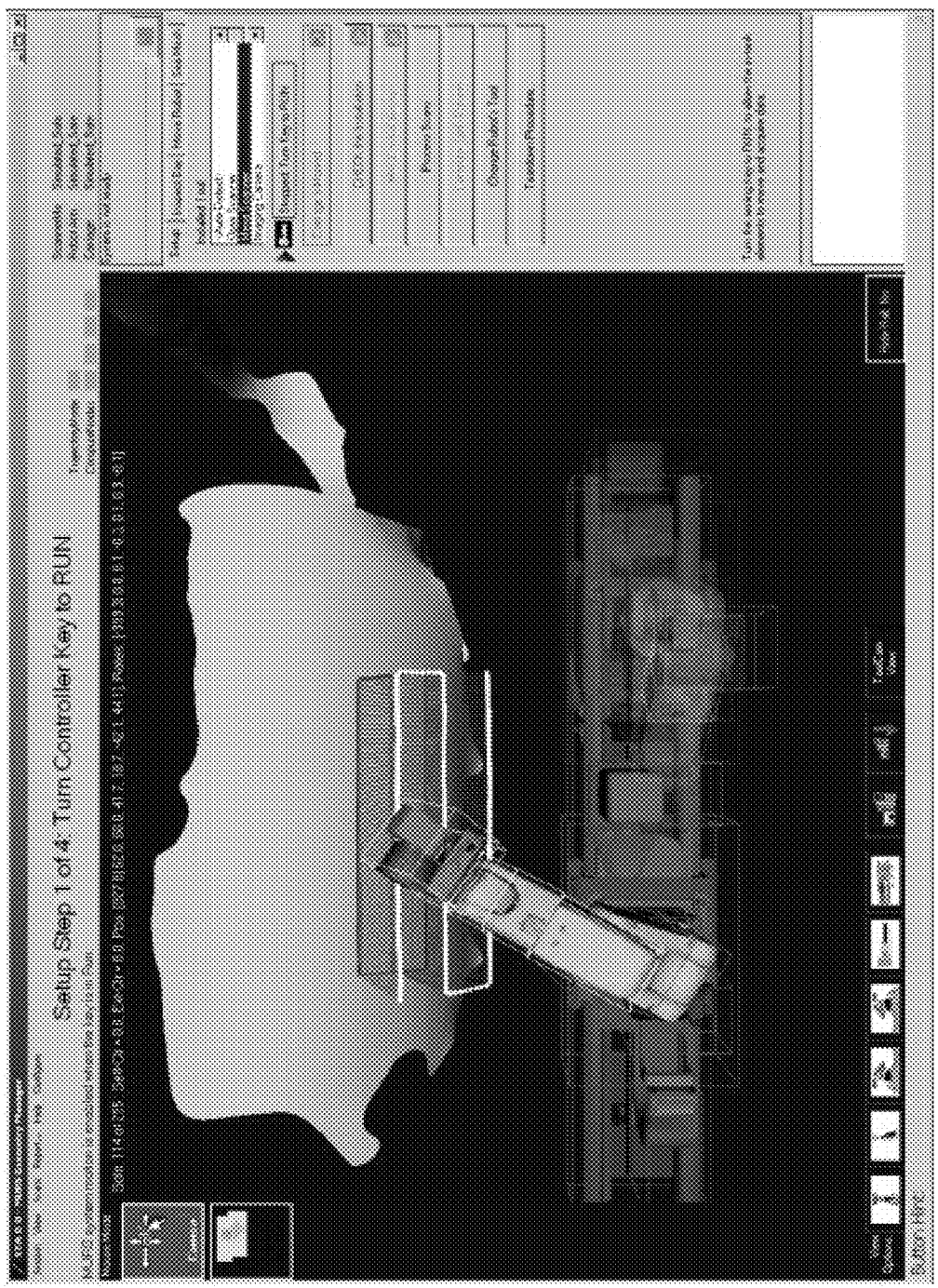
FIG. 15 is a plan view of a trajectory preview for the coverage trajectory computed in FIG. 13.
Figure 16:
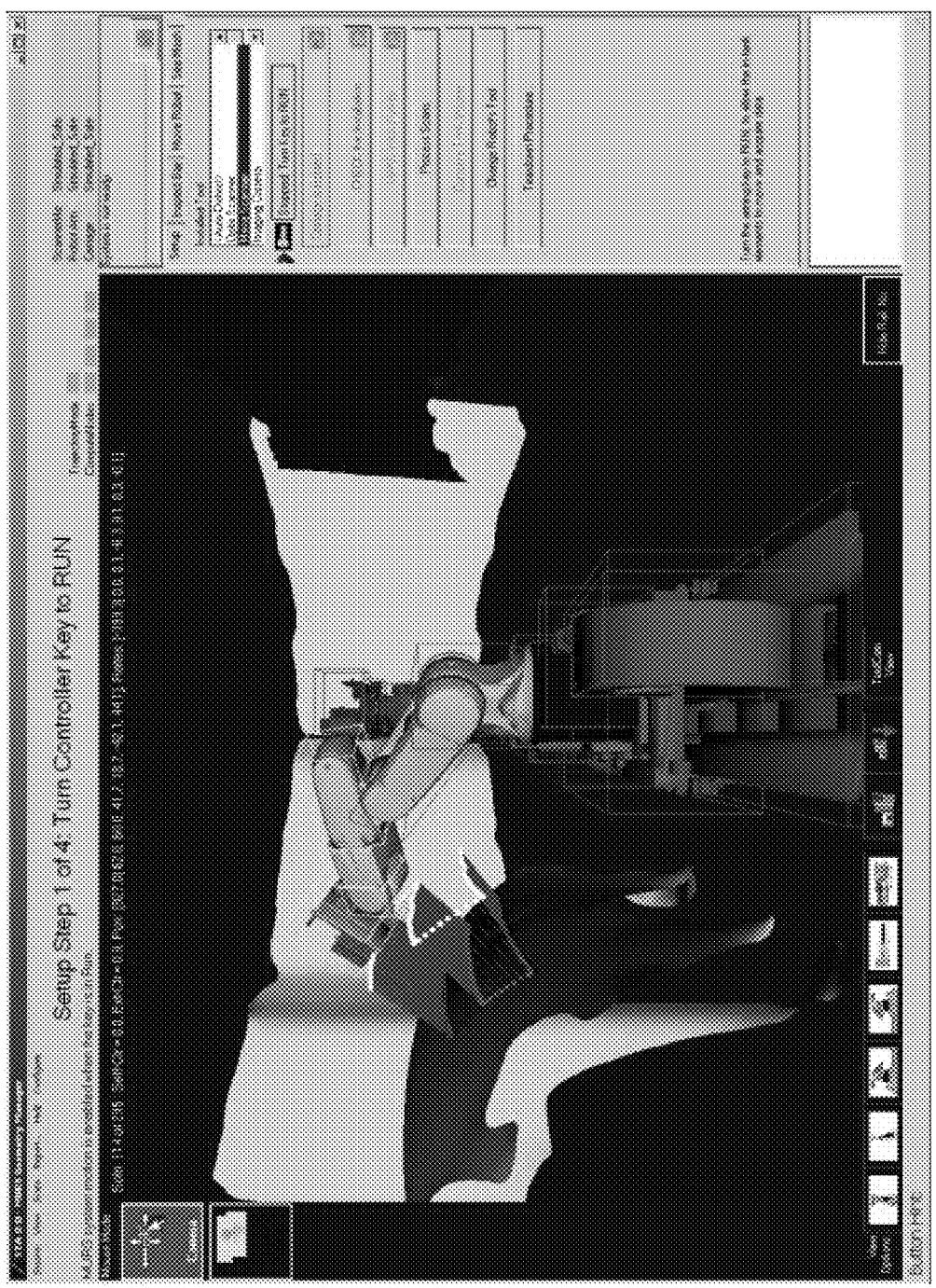
FIG. 16 is a side view of the trajectory preview shown in FIG. 15.

If no solution can be found, the best solution is returned based upon weighting scores for the various criteria. The following steps are part of the process:
  Adjust the simulator view so that the work surface is roughly orthogonal to the view.
  Click and drag the mouse over the work surface to define a rectangular "coverage patch" in which processing will occur, as illustrated in FIG. 12. The patch should be topologically simple, meaning that there are no holes or obstacles contained within.
  Create the coverage trajectory by selecting row spacing, point spacing, and end-effector offset as shown in FIGS. 13 and 14.
  Compute the trajectory and preview the results as shown in FIGS. 15 and 16.
  If acceptable, execute the trajectory.

Figure 17:
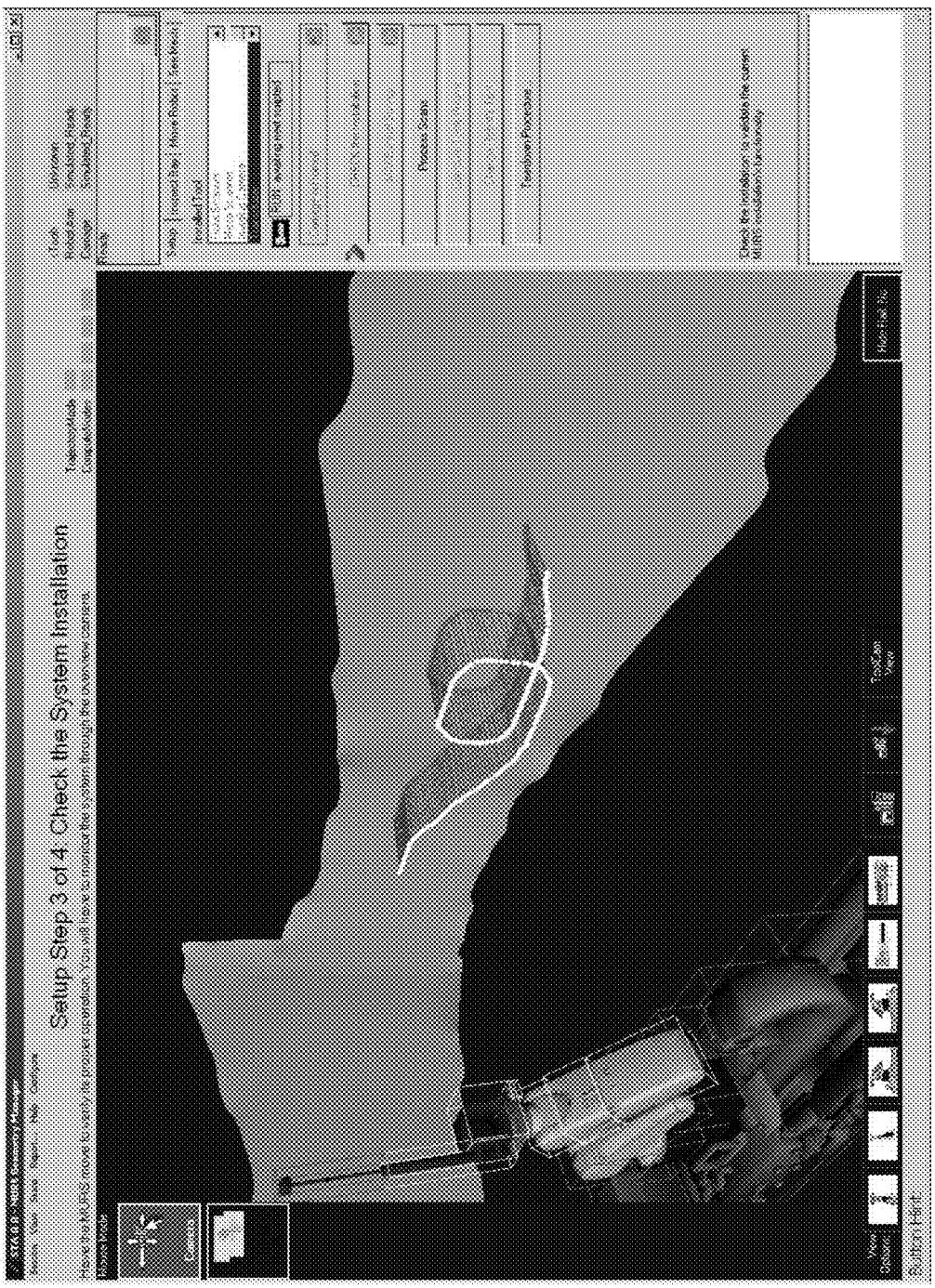
FIG. 17 illustrates a freehand trajectory created without selecting a rectangular patch by clicking and dragging a mouse to generate the freehand trajectory.

An optional mode for creating trajectories is a "free-hand" approach, where the user can click the mouse over the desired work surface to "draw" the desired trajectory on the work surface, in a manner similar to other graphics editing software, as illustrated in FIG. 17. The invention also contemplates utilization of the free-hand approach to create different shapes such as, for example, arcs, ellipses, circles, etc., within the defined region. If an ellipse is desired, the user would click and drag to create a bounding rectangle and select an ellipse to fill it. This feature would be useful for manually created trajectories for avoiding holes or other complex surface features.

The invention also contemplates facilitating motion planning by synchronization of the rail and the robot arm movements. By utilizing an upgraded robot controller with extended axis control capability (a common feature among many robot manufacturers), both the arm and the rail can be moved synchronously to permit contour following along longer surfaces that lie parallel to the rail. In addition, the extra Degree Of Freedom (DOF) with the extended axis control capability provides redundancy in the system, which allows for more robust trajectory planning that includes standard singularity and joint limit avoidance. These improved features are realized by improvements to the existing software.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. Thus, while the invention has been illustrated and described for use within aircraft fuel tanks, it will be appreciated that the invention also may be utilized within any confined space that is accessible to the robot system.

The invention further contemplates the use of a color camera capable of acquiring color imagery of the workspace. This imagery, when registered to the 3D data obtained from the scanner, can be used to create a pseudo-photorealistic 3D model of the environment. This model can be used by the user for various purposes and archived to create a 3D representation of the workspace. In addition, this 3D color model can be processed using various machine vision algorithms to identify regions of interest for robotic processing.

The invention also contemplates real-time collision avoidance such that the remote operator may command the robot's end-effector in a teleoperated sense using a joystick or similar device to operate the robot in either an enclosed or non-enclosed space. Commanded robot positions are checked first in the simulator before being sent to the robot. Commands are provided in velocity mode and integrated to determine the desired robot position. Individual joint rates of the robot are calculated to provide the desired end-effector velocity in Cartesian space. A look-ahead feature projects the commanded velocity several time steps ahead into the future to provide a safety buffer since the robot requires a finite time to stop motion dependent on the current velocity. Any command that would potentially result in a collision between the robot and the workspace or between different elements of the robot itself is not sent to the robot controller. The user is then alerted to the potential collision.

Furthermore, it is contemplated that the robot system may include a 3D scanning device operable to gather environmental data. Additionally, the computer and associated hardware is operative to utilize voxelized data to perform real-time collision checks between the robot arm and the environment, and between the robot arm and itself. This provides Cartesian control of the robot arm's tool using an input device such as a joystick to command the robot in a tele-operated sense to operate within the robot operating environment. It is further contemplated that the digital camera is used to create a pseudo-photorealistic 3-dimensional model by registering data from the camera with the scanned data from the 3-dimensional scanner.

The invention also contemplates that that the method may include using the mouse to click and drag across the virtual geometry to create a region for robotic processing whereby a coverage trajectory is calculated to cause the robot's tool to maintain a prescribed stand-off from the scanned surface while following the contour of said surface. Additionally, the method may include s using an input device such as a joystick to command the robot's tool in Cartesian space whereby collision checking is performed in real-time to prevent collisions between said robot, itself, and the environment.

What is claimed is:

1. A robot system comprising:
a track;
a robot that includes a robot arm having multiple degrees of freedom of movement;
a carriage configured to carry said robot on said track;
a 3D scanner mounted upon an end of said robot arm, said 3D scanner configured to collect environmental data from an operating environment surrounding said robot while said robot remains within a safe working volume; and
an operator station that includes a computer and associated software and is located remotely from said robot arm, said operator station configured to control movement of said robot arm and said carriage;
wherein, in said safe working volume, said robot is configured to translate along said track in a tucked position without colliding with any portion of the operating environment,
wherein said 3D scanner is a laser device configured to gather said environmental data, wherein said computer and associated software is configured to voxelize said scanned data and to utilize said voxelized data to define said operating environment, and wherein said computer and associated hardware is configured to utilize said voxelized data to define movements of said carriage and said robot arm with said operating environment that also avoids collisions between said carriage and said robot arm with said operating environment.

2. The robot system according to claim 1 wherein said computer and associated software is configured to acquire geometrical data regarding the operating environment of said robot, and further wherein said computer and associated software is also configured to utilize said geometrical data to perform operations within said operating environment with virtual tooling.

3. The robot system according to claim 1 wherein said computer and associated hardware are configured to define paths within an enclosed space for moving said robot arm and said carriage such that said 3D scanner is positioned to scan a selected point within said space while also avoiding collision with any of the operating environment defined by said data collected by said 3D scanner.

4. The robot system according to claim 1 wherein said computer and associated hardware is configured to produce continuous trajectories for contour following by first finding a plurality of collision-free candidate solutions and then using standard pseudo-inverse Jacobian control methodology to compute required joint angles and rates to achieve a desired path for an end-effector while also maintaining the proper orientation and path speed.

5. The robot system according to claim 3 further including a digital camera mounted upon said robot arm and a display device, said digital camera and display device configured to provide a pictorial view of the operating environment as an aid to guiding movement of said robot.

6. The robot system according to claim 1 further including multiple computing nodes connected by Ethernet, said nodes spawning multiple threads to determine potential paths for movement of said robot.

7. The robot system according to claim 1 wherein said robot arm is configured to carry at least one tool.

8. The robot system according to claim 7 wherein said operating environment defines a non-enclosed space.

9. The robot system according to claim 7 wherein said operating environment defines an enclosed space.

10. A method for operating a robot system that comprises the steps of:
providing a robot system that includes: a robot arm having multiple degrees of freedom of movement; a carriage configured to carry the robot; a 3D scanner mounted upon an end of the robot arm; and an operator station located remotely from the robot arm, the operator station configured to control movement of the robot arm and the carriage;
collecting 3D scanned data with the 3D scanner regarding an operating environment surrounding the robot while the robot remains within a safe working volume;
using the 3D scanned data to form an operating environment mesh that represents the operating environment;
selecting a desired position on the operating environment mesh;
determining a path for moving the robot and the carriage that avoids any collisions between the robot, the 3D scanner and the operating environment such that the 3D scanner is positioned to scan the selected desired position; and
moving the robot and the carriage via the determined path, wherein, in said safe working volume, the robot is configured to translate along the track in a tucked position without the robot, said 3D scanner, or said carriage colliding with any portion of the operating environment.

11. The method according to claim 10 wherein the operator station includes a display screen in communication with a mouse with the display screen displaying a cursor controlled by the mouse and further wherein the selection of a desired position on the operating environment mesh includes using the mouse to position a cursor upon the display screen at the selected desired position for the robot and then depressing a button on the mouse to notify the operator station of the selected desired position for the robot.

12. The method according to claim 10 further including determining a desired configuration of the robot arm and desired position of the carriage along the track and determining a path for moving the robot and the carriage to their desired positions without incurring any collisions between portions of said robot, and between said robot arm, said 3D scanner, and said operating environment.

13. The method according to claim 12 wherein the robot performs a desired operation once the carriage and robot arm have moved to the desired positions.

14. The method according to claim 10 wherein the collected 3D scanned data is voxelized to define the operating environment, and wherein the computer and associated hardware is configured to utilize the voxelized data to determine the paths of the robot arm and the carriage that avoids any collisions between the robot, the 3D scanner, and the operating environmenth.

15. The method according to claim 10 wherein the operator station includes a computer and associated software that is configured to use a Rapidly-exploring Random Tree (RRT) motion planning algorithm in combination with the 3D data gathered with the 3D scanner to control movement of the robot arm and the carriage within an enclosed area.

16. The method according to claim 10 wherein a digital camera is used to create a pseudo-photorealistic 3D model by registering data from said digital camera with the 3D scanned data from said 3D scanner.

17. The method according to claim 11 wherein the robot arm is configured to carry a tool, and wherein the selection of a desired position on the operating environment mesh includes using the mouse to click and drag across the virtual geometry to create a region for robotic processing whereby a coverage trajectory is calculated to cause the tool to maintain a prescribed offset from portions of said operating environment mesh while following the contour of said mesh.

18. The method according to claim 11 wherein the robot arm is configured to carry a tool.

19. The robot system according to claim 1 wherein said computer and associated software is configured to use a motion planning algorithm in combination with said environmental data collected with said 3D scanner to control movement of said robot arm and said carriage within said operating environment.

20. A robot system comprising:
a track;
a robot that includes a robot arm having multiple degrees of freedom of movement;
a carriage configured to carry said robot on said track;
a 3D scanner mounted upon an end of said robot arm, said 3D scanner configured to collect 3D environmental data from an operating environment surrounding said robot while said robot remains in a safe working volume; and
an operator station that includes a computer and associated software and is located remotely from said robot arm, said operator station configured to control movement of said robot arm and said carriage;
said robot system configured to collect the scanned 3D environmental data with the 3D scanner regarding an operating environment surrounding the robot, use the scanned 3D environmental data to form a mesh that represents the operating environment, and select a desired position on the mesh for the robot within the robot operating environment,
wherein, in said safe working volume, said robot is configured to translate along said track in a tucked position without colliding with any portion of the operating environment.

21. The robot system according to claim 20 wherein the robot system is further configured to determine a path for moving the robot and the carriage such that the 3D scanner is positioned to scan a selected desired position on the mesh that avoids any collisions between the robot, the 3D scanner, and the mesh.

* * * * *